US006681588B2

(12) United States Patent
Zeigler

(10) Patent No.: US 6,681,588 B2
(45) Date of Patent: Jan. 27, 2004

(54) ENVIRONMENTALLY CONTROLLED SLEEPING ZONE AND THERMAL BARRIER

(75) Inventor: Terry Zeigler, Byron, IL (US)

(73) Assignee: Bergstrom, Inc., Rockford, IL (US)

( * ) Notice: Subject to any disclaimer, the term of this patent is extended or adjusted under 35 U.S.C. 154(b) by 0 days.

(21) Appl. No.: 10/144,460

(22) Filed: May 13, 2002

(65) Prior Publication Data

US 2003/0209021 A1 Nov. 13, 2003

(51) Int. Cl.[7] .................................................. B60H 1/32
(52) U.S. Cl. ............................. 62/239; 62/244; 165/42; 454/139
(58) Field of Search ...................... 62/239, 244, 259.1; 165/42, 43; 454/87, 139, 197

(56) References Cited

U.S. PATENT DOCUMENTS

| 4,300,720 A | * | 11/1981 | Baier et al. ............. 237/12.3 A |
| 4,368,902 A | * | 1/1983 | McDowell ................. 280/749 |
| 4,825,921 A | | 5/1989 | Rigter |
| 5,238,282 A | | 8/1993 | Watson et al. |
| 5,438,842 A | * | 8/1995 | Watkins et al. ............... 62/89 |
| 5,876,059 A | * | 3/1999 | Kleinberg ................ 280/730.1 |
| 5,901,752 A | | 5/1999 | Peiffer et al. ................. 62/480 |
| 5,901,780 A | | 5/1999 | Zeigler et al. ................. 165/42 |
| 6,016,662 A | | 1/2000 | Tanaka et al. |
| 6,038,877 A | | 3/2000 | Peiffer et al. ................. 62/244 |
| 6,276,161 B1 | | 8/2001 | Peiffer et al. ................. 62/406 |
| 6,470,960 B2 | * | 10/2002 | Kampf et al. ................. 165/42 |

FOREIGN PATENT DOCUMENTS

| EP | 1069031 | 1/2001 |
| JP | 62110515 | 5/1987 |
| JP | 62149509 | 7/1987 |

* cited by examiner

*Primary Examiner*—William E. Tapolcai
(74) *Attorney, Agent, or Firm*—Leydig, Voit & Mayer, Ltd.

(57) ABSTRACT

An environmentally controlled sleeper area of a vehicle that is contained within a bunk area (that is in turn adjacent to a cab area of the vehicle). The bunk area has an end wall and a pair of side walls extending generally perpendicular to the end wall. The side walls and the end wall encompass or surround three sides of a bed. Along the remaining open side of the bed, the vehicle operator can maneuver in and out of the bed. An extendible and retractable thermal barrier is provided along the remaining open side of the bed. The thermal barrier rises above the top surface of the bed and thermally separates the sleeping area from a remainder of the bunk area. An environmental control unit provides thermally conditioned air that becomes trapped between the back wall and thermal barrier by virtue of the thermal barrier.

39 Claims, 6 Drawing Sheets

ENVIRONMENTALLY CONTROLLED SLEEPING ZONE AND THERMAL BARRIER

FIELD OF THE INVENTION

The present invention relates generally to heating and air conditioning systems, and more particularly relates to air conditioning systems that are particularly suited for large over-the-road vehicles.

BACKGROUND OF THE INVENTION

As is known, large over-the-road vehicles such as tractor-trailer trucks are used for transporting a wide variety of items. Often, the transport routes of these vehicles are extremely long, frequently extending cross-county. On such long routes, the drivers of these vehicles frequently sleep within the vehicle. Accordingly, as is known, the passenger area of a large tractor-trailer truck is typically divided into a cab area and a sleeping area or bunk area (also known as the "sleeper"). The bunk area is provided behind the cab area. Frequently, the bunk area is separated from the cab area by a curtain or other divider, and includes a bed upon which the driver can sleep.

It can certainly be appreciated that on hot summer nights or cold winter nights, the driver will operate the air conditioning system or heating system, at least in the bunk area to maintain a comfortable sleeping climate. Presently, this is done in many different ways. First, the driver may leave the truck running on idle to maintain power to the heating and air conditioning system, so that the appropriate temperature in the bunk area may be maintained. Since the drivers typically sleep for several hours at a time, this approach is undesirable in that it wastes fuel and places undue wear on the engine components that are left running. Furthermore, the constant engine noise is distracting, not to mention the release of carbon monoxide and other pollutants into the environment.

Another approach taken by drivers is often to superheat or supercool the bunk area, just before shutting the engine down. In this regard, the driver may direct the heating and air conditioning system to the bunk area and either overheat the area in the wintertime or cool it to an extremely low temperature in the summer time. Since the truck body provides some insulating characteristics, it takes a certain amount of time for the indoor and outdoor temperature to equalize. By superheating of supercooling the bunk area, (i.e., increasing the temperature differential), the driver can extend the time period before the temperatures have equalized. In mild climate areas, this approach may be sufficient. However, in extremely harsh climates, this approach does not provide a sufficient time period of comfortable climate and therefore the driver must restart the engine if he wishes to maintain a comfortable climate. Moreover, this approach tends to result in an uncomfortably hot or cold climate immediately after the driver shuts off the engine (i.e., the superheated or supercooled climate).

Another method for heating and cooling the bunk area is to use a heating and air conditioning system which is auxiliary in nature, in that it is capable of operating when the engine of the truck is shut off.

For example, proposals have been made for heating and air conditioning the bunk area which involve what is known as "passive" auxiliary systems in that they use thermal storage media to store thermal energy during normal operation of the truck. Passive auxiliary systems then deliver that thermal energy in the form of heating or air conditioning when the engine of the truck is shut down, such as that disclosed in Peiffer et al., U.S. Pat. No. 5,901,572, the entire disclosure of which is hereby incorporated by reference. Passive systems require sufficient energy to be stored during normal operation of the truck to provide heating or air conditioning when the engine is shut down. Thus, these types of systems can only heat or cool the passenger area for a limited period of time. The amount of time that these passive systems can provide heating or cooling is limited by the size of the system and amount thermal storage media contained in the system. Further, in order to heat or cool the sleeper area for a prolonged time period, the thermal storage media must be charged by the operation of the truck for a prolonged period. Thus, the amount of heating or cooling available at any given time is also limited by how long the truck was previously operated.

In contrast to passive systems, heating and air conditioning systems which are "active" are those systems which are connected to their own independent power source and do not rely upon storage media, such as that disclosed in Zeigler et al., U.S. Pat. No. 5,901,780, the entire disclosure of which is hereby incorporated by reference. Thus, these systems can drive the heating and air conditioning system for as long as is needed assuming that the independent power supply is sufficient. There are two proposed ways to power active heating and air conditioning systems. Fuel fired heating and air conditioning systems are known such as that disclosed in the '780 patent. A more common form of an active heating and air conditioning system is an electrically powered system in which stored electrical energy (e.g. from a battery) is used to generate heat or cool the air. With either type of system, the size of the auxiliarly system can be matched to meet the particular heating or cooling requirements of the vehicle. Under existing technology, it is not uncommon for active system up require up to about 3500 BTU/hr of energy to adequately cool the bunk, area, and up to 7000 BTU/hr to adequately heat the bunk area.

While it is easy enough to simply bulk up or increase the size of an environmental control system to provide a desired total energy output whether it be a passive or active system, providing for such high energy outputs requires space, and is both inefficient and expensive. Specifically, larger heat or cooling outputs requires more thermal storage media for passive systems, or larger heaters and air conditioning compressors (or other air conditioning units) for active systems. Further, in over-the-road vehicles where space is very limited and vehicle designers like to allocate as little space as necessary for a particular system, increasing the size of an auxiliary environmental control system is not only expensive but also undesirable as it consumes valuable space. Prior art attempts at reducing size and cost of the most common systems (electrical systems) have primarily dealt with providing alternative systems such as passive systems.

Due to the power requirements and drawbacks and size of auxiliary environmental control units, such auxiliary systems have not been widely implemented. Instead, the most common practice still is to run the vehicle while the driver rests or super cool or superheat the bunk area.

BRIEF SUMMARY OF THE INVENTION

In light of the above, it is a general aim of the present invention to provide a more efficient or practical way to heat and cool a sleeping area.

It is an objective according to one aspect of the present invention to provide a more efficient way to heat and/or cool the sleeping area of a vehicle that utilizes an auxiliary environmental control unit.

In that regard, it is an objective of the present invention to provide a more efficient way to heat and/or cool the sleeping area of a vehicle for both active and passive type environmental control units.

It is a further objective of the present invention according to a further aspect to reduce the size and cost of auxiliary heating and/or air conditioning units in over-the-road vehicles.

In accordance with these and other objectives, the present invention is directed an environmentally controlled sleeping area in which a thermal barrier projects above a bed to at least partially enclose all four sides of the bed. An environmental control unit providing thermally conditioned air between the four sides of the bed. The thermal barrier prevents thermally conditioned air from escaping to the surrounding area.

According to a significant aspect of the present invention, the invention is employed in the bunk area of a vehicle in which the bunk area is adjacent to a cab area of the vehicle. As is conventional, the bunk area has an end wall and a pair of side walls extending generally perpendicular to the end wall. The side walls and the end wall encompass or surround three sides of the bed. Along the remaining open side of the bed, the vehicle operator can maneuver in and out of the bed. An extendible and retractable thermal barrier is provided along the remaining open side of the bed. The thermal barrier rises above the top surface of the bed and thermally separates the sleeping area from a remainder of the bunk area. An environmental control unit provides thermally conditioned air between the back wall and thermal barrier that becomes trapped therebetween by virtue of the thermal barrier.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
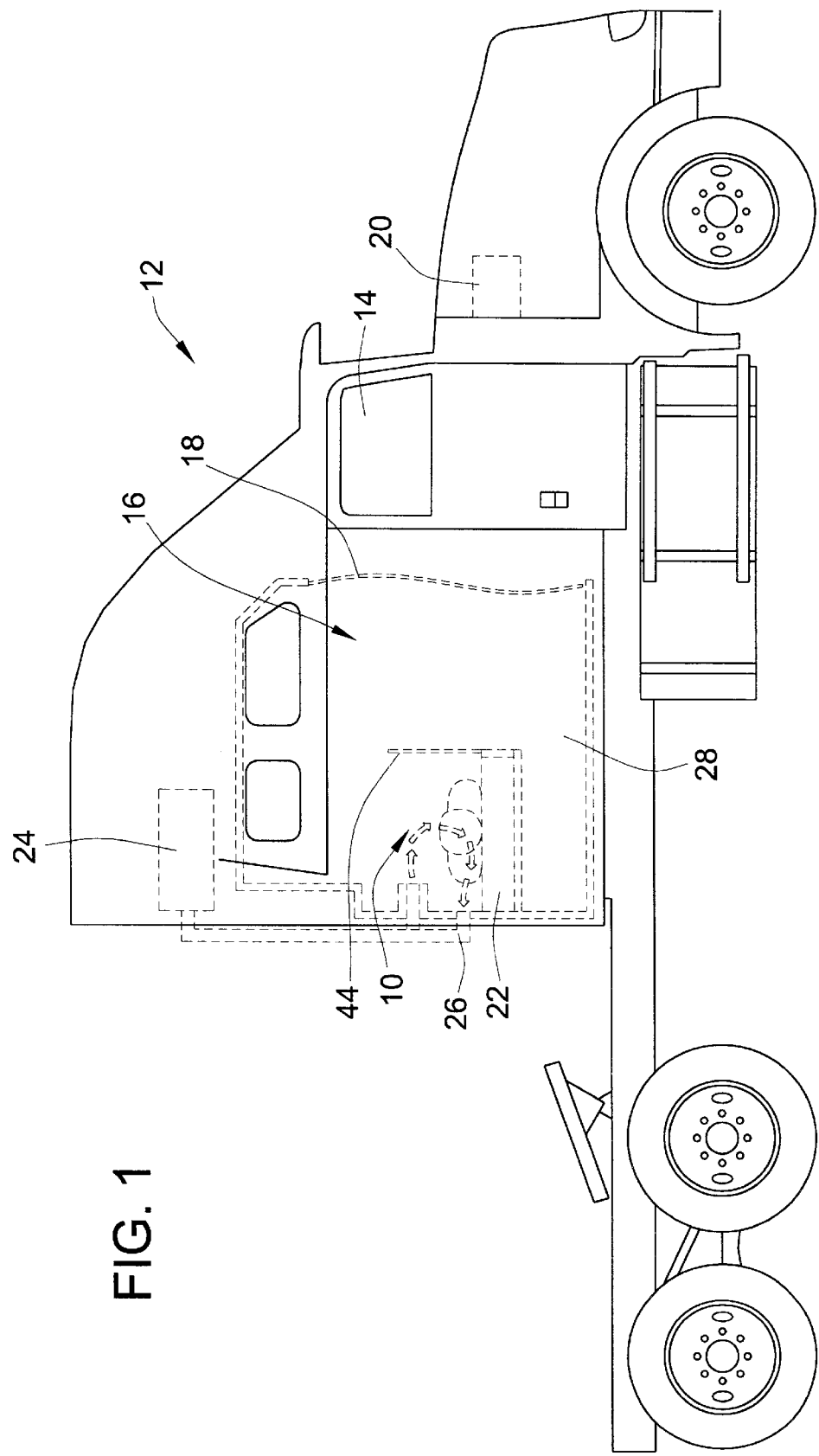
FIG. 1 is a side elevation of an over-the-road commercial vehicle incorporating an environmentally controlled sleeping area according to a preferred embodiment of the present invention.
Figure 2:
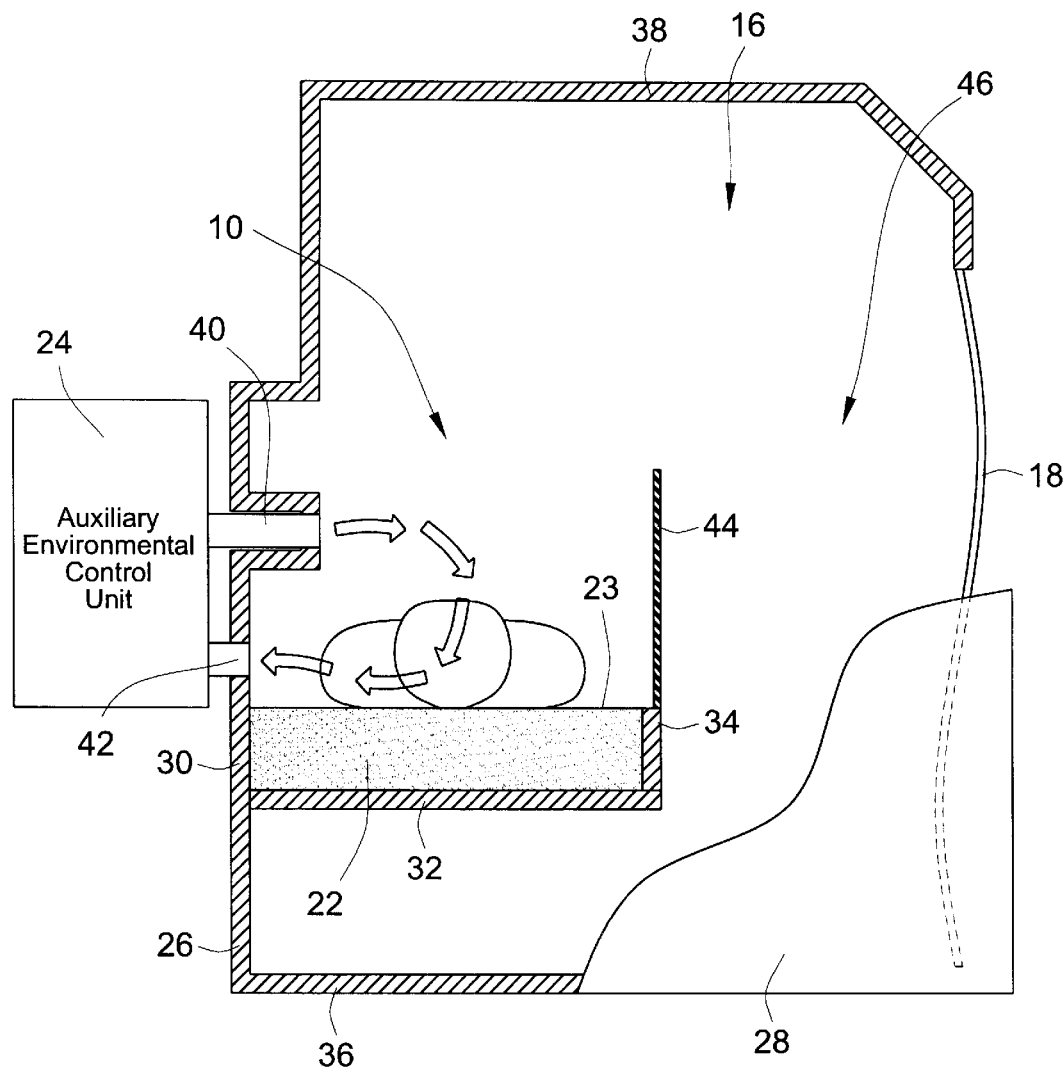
FIG. 2 is a cross section of the bunk area of the over-the-road commercial vehicle of FIG. 1, with an auxiliary environmental control unit being schematically depicted.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For purposes of illustration, an environmentally controlled sleeping area 10 according to an embodiment of the present invention is shown as incorporated into an over-the-road commercial vehicle 12. The commercial vehicle 12 includes a cab area 14 and a bunk area 16 that may be separated by a retractable curtain 18. The retractable curtain 18 can provide separate thermal environments among the cab area 14 and the bunk area 16. A vehicle operator can operate and drive the commercial vehicle 12 when in the cab area 14. The thermal environment of the cab area 14 is controlled with a primary environmental control unit 20 (e.g. a heater and/or air conditioner) that is driven off of the vehicle engine while it is running. The bunk area 16 provides a bed 22 (or sometimes two beds, one above the other) whereby the driver can sleep or rest. Typically, an auxiliary environmental control unit 24 (e.g. a heater and/or air conditioner) is provided to allow for control over the thermal environment of the bunk area 16.

The bunk area 16 is located within the outer shell of the vehicle cab between a back end wall 26, a pair of sidewalls 28 extending generally perpendicular to the back end wall 26, and the retractable curtain 18. The bed 22 is typically provided along the far back end wall 26 of the bunk area 16 with one side 30 adjacent the back end wall 26 and two other sides or ends 32 adjacent the sidewalls 28. Thus, three sides of the bed 22 are encompassed or surrounded by the shell of the vehicle body (e.g., by walls 26, 28). This leaves an open side 34 of the bed 22 along the front whereby a person can maneuver into and out of the bed 22. The bed 22 is typically elevated a couple of feet above the floor 36 of the bunk area 16. Because bunk areas are relatively small or compact as space in over-the-road vehicles is often limited or subject to tight constraints, it is desirable to provide as much space as possible over the bed to the ceiling 38. A short bed elevation keeps the bunk area 16 relatively spacious and prevents vehicle operators from feeling trapped or claustrophobic when sleeping or resting. In some over-the-road vehicles, bunk areas will also have bunk beds (one bed over the other) to accommodate more than one person in the bunk area.

The auxiliary environmental control unit 24 includes an air outlet 40 that delivers thermally conditioned air to the sleeping area 10 over the bed 22. In bunk bed situations, two outlet locations, one for each bed, may be provided. In the illustrated embodiment, the outlet 40 is provided along the back end wall 26, which is a common arrangement. In other arrangements, the outlet may be provided through the ceiling 38, towards one or both of the corners between the back end wall 26 and side walls 28, along the side walls 28, or other suitable location wherein thermally conditioned air is expelled above the bed 22. The auxiliary environmental control unit 24 may be mounted along the ceiling 38 or along the back end wall 26, or beneath the bunk bed, or in any other suitable location.

The auxiliary environmental control unit 24 may also include a return inlet 42 that draws in air from the bunk area 16. Air entering the return inlet 42 may be heated or cooled and then recycled into the bunk area through the outlet 40 and/or may vented to allow for intake of fresh air into the bunk area (typically after passing through heat exchangers in the environmental control unit 24). In the illustrated embodiment, the return inlet 42 is located underneath the outlet 40. This generally creates a substantially circular return flow path for conditioned air in the environmentally controlled sleeping area 10 as shown schematically in FIG.

2. It will be appreciated that other locations for the inlet and outlet are possible.

In accordance with the present invention, the disclosed embodiment includes a thermal barrier along the open side 34 of the bed 22, shown in the form of a extendible and retractable curtain 44. The curtain 44 rises above the top surface 23 of the bed 22 and between side walls 28 to entrap thermally conditioned air over the top surface 23 of the bed 22, thereby creating the thermally conditioned sleeping area 10 for the person sleeping or resting there. The curtain 44 separates the thermally conditioned sleeping area 10 from the remainder of the bunk area 16. The curtain 44 thereby sections off a portion of the bunk area 16 and acts as a barrier to prevent air in the remainder of the bunk area 16 from mixing with the thermally conditioned air contained in the sectioned off sleeping area 10. Thus, it is not necessary to thermally condition the entire bunk area 16, but instead only the sleeping area 10 in which a person actually sleeps or rests. As a result a large temperature gradient exists between the remainder 46 of the bunk area 16 and the sectioned off sleeping area 10.

In a preferred embodiment, the curtain 44 rises only partially above the top surface 23 of the bed 22. In this manner, persons sleeping on the bed 10 do not feel overly trapped or confined, as the space in the bunk area is already relatively compact. The use of a half curtain 44 is thus a compromise between competing interests of completely sealing off the sleeping area (for completely preventing air mixing and thereby maximize efficiency and reduce energy requirements), and the desire to have a completely open side along the bed to reduce the feeling of entrapment or confinement. To balance these competing interests, the curtain 44 may have a vertical height of between about 1 foot and about 2 feet above the top surface of the bed 22. The curtain 44 preferably rises above the bed 22 to a vertical height greater than a normal sized person lying horizontally, and/or is at a greater vertical elevation than the vertical elevation of the air outlet 40.

In most auxiliary environmental control units, the air conditioning requirements typically determine the size and energy requirements of the unit. The use of a half curtain 44 is particularly advantageous for reducing the energy requirements needed for air conditioning and thereby reduces the overall size, weight, energy requirements and cost of the auxiliary environmental control unit 24 (and thereby increases energy efficiency). Because cool air is denser than hot air, cool air has a tendency to drop downward. The curtain 44 contains the cooler air in the sleeping area 10 and prevents the cooler air from escaping off of the top surface 23 of the bed 22. Further, with the return inlet 42 below the outlet 40, thermally conditioned air is naturally drawn downward and is thereby trapped in the sectioned off sleeping area 10. As a result, this greatly reduces the amount of cool air that passes over the top of the half curtain 44 and greatly reduces the likelihood that cool air will mix with hotter air contained in the remainder 46 of the bunk area 16.

Figure 3:
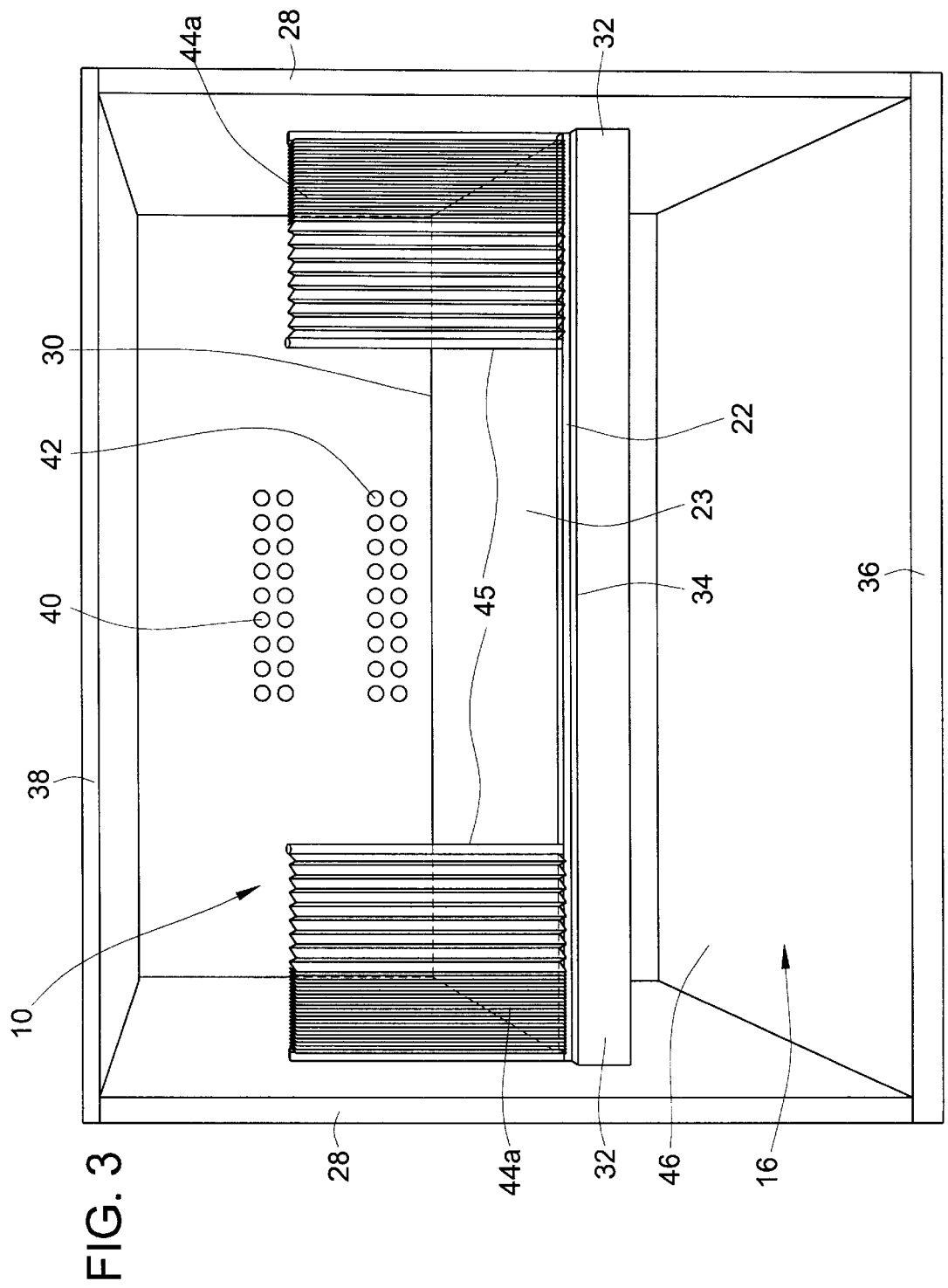
FIGS. 3 and 4 are rearward viewing perspective views of the bunk area of the over-the-road commercial vehicle with a first embodiment of a curtain to provide a thermal barrier and an environmentally controlled sleeping area, with different positions of the curtain shown in FIGS. 3 and 4.
Figure 4:
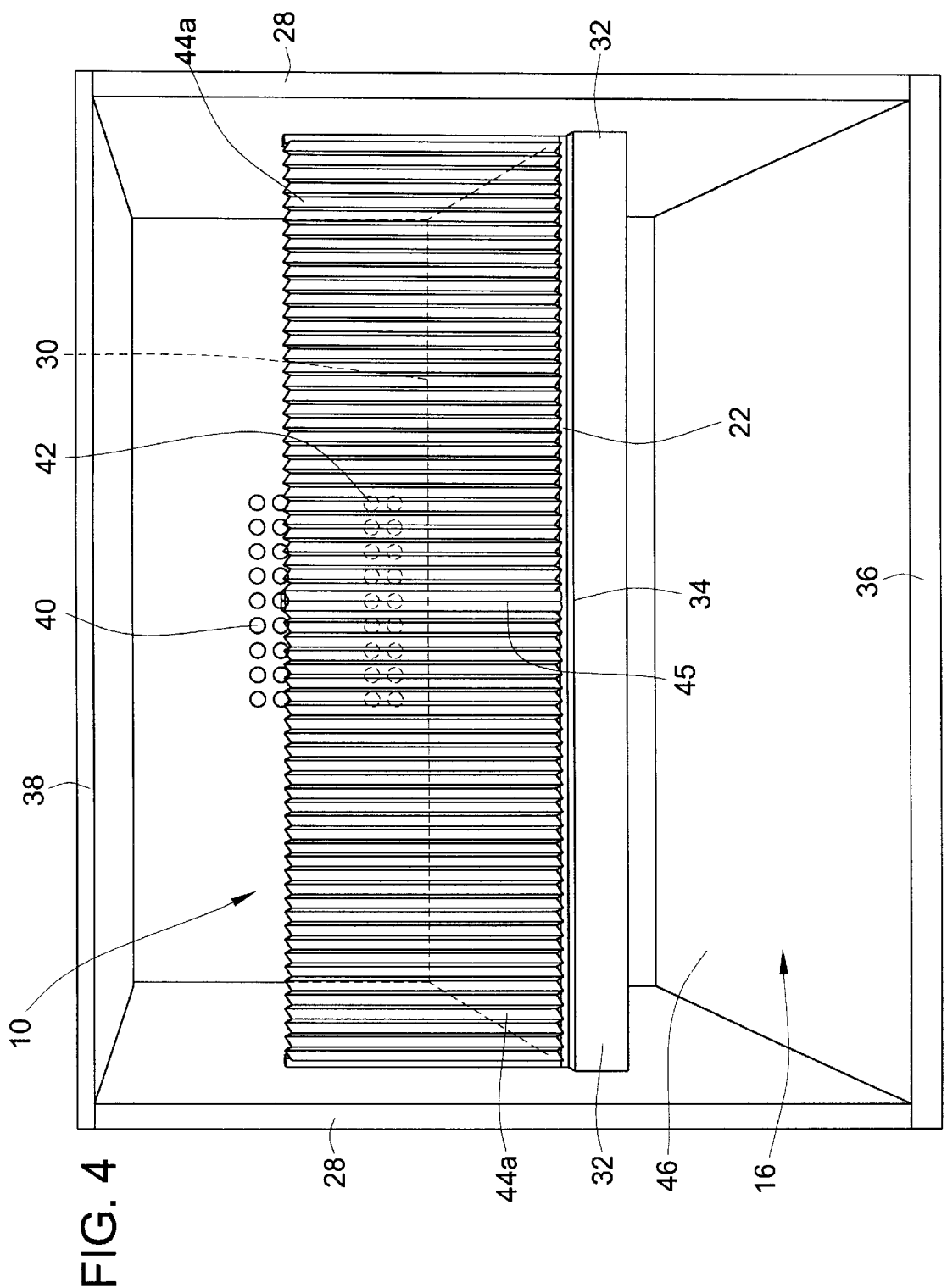

Two different embodiments of a curtain for the thermal barrier are shown. In FIGS. 3–4, one embodiment of the half curtain 44 is provided by a horizontally extendible and retractable curtain 44a. A split 45 may be provided in the middle such that left and right hand portions of the curtain 44a extend and retract from opposing sidewalls 28, where it can be stored when not in use. The curtain 44a can take any number of arrangements or implementations such as track guided, self supporting, roller blinds, or other suitable embodiment whereby the curtain is extendible and retractable horizontally.

Figure 5:
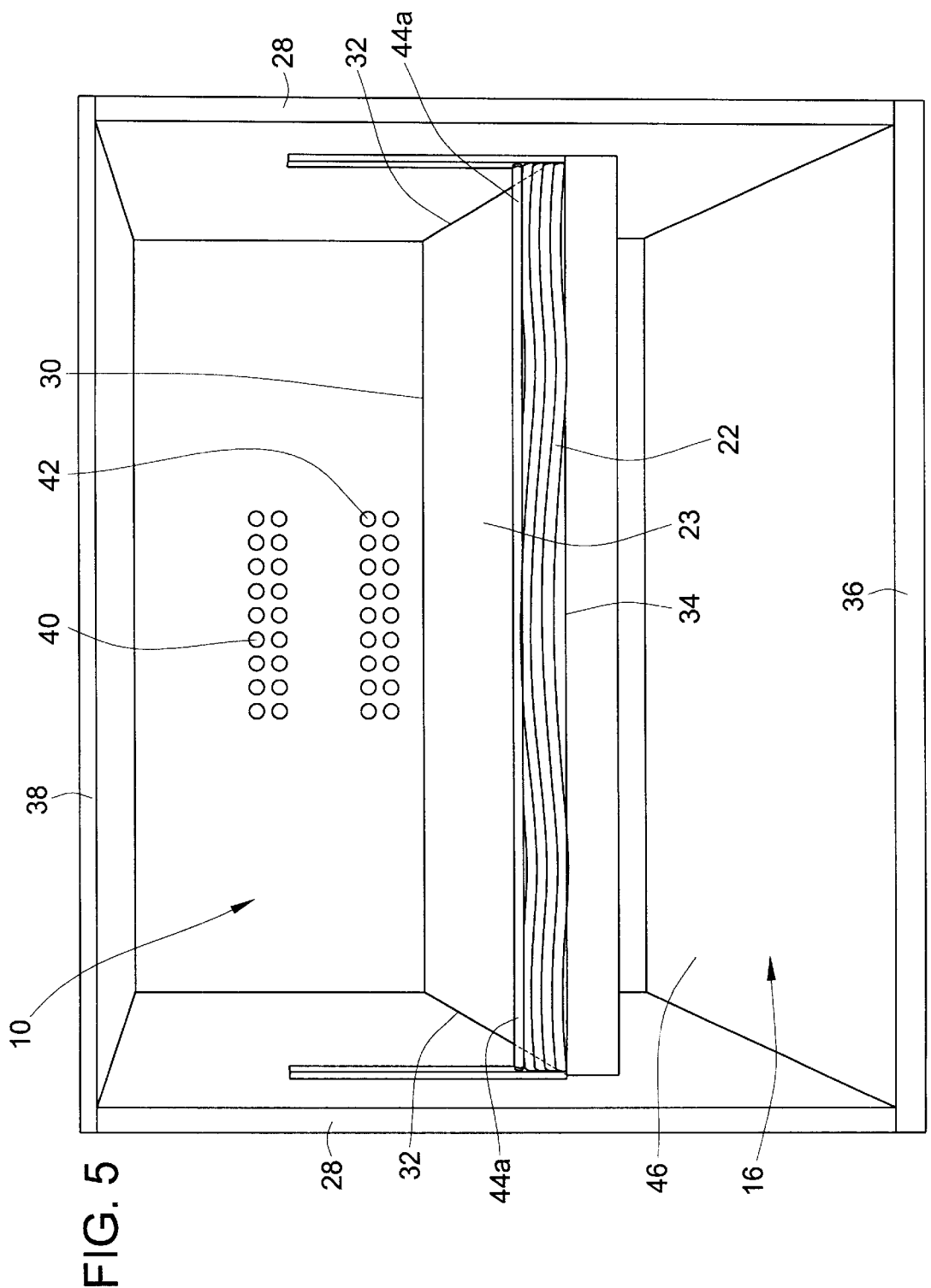
FIGS. 5 and 6 are rearward viewing perspective views of the bunk area of the over-the-road commercial vehicle with a second embodiment of a curtain to provide a thermal barrier and an environmentally controlled sleeping area, with different positions of the curtain shown in FIGS. 5 and 6.
Figure 6:
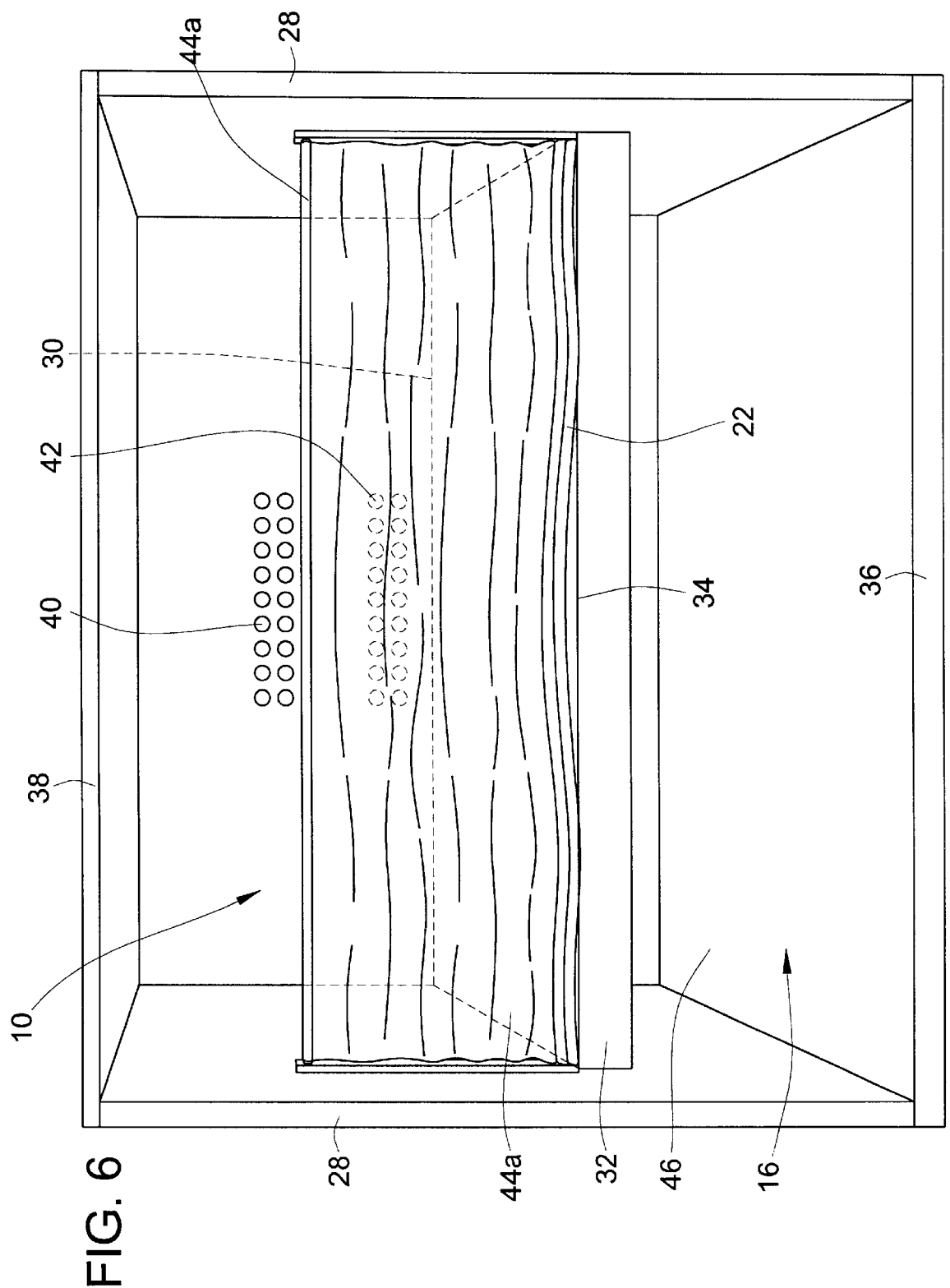

In FIGS. 5–6, another embodiment of the half curtain 44 is provided by a vertically extendible and retractable curtain 44b. This curtain 44b can take any number of arrangements or implementations such as track guided, self supporting, roller blinds, or other suitable embodiment whereby the curtain is extendible and retractable. This curtain 44b is preferably stored at the base of the bed 22 and may be selectively adjustable to different vertical elevations as may be desired.

In addition to curtains, the thermal barrier may also take the form of a rigid or flexible barrier wall than can be selectively mounted and dismounted in upright and down positions. A barrier wall may be stored under the bed or along the ends of the bed, or any other suitable location.

The specific type of auxiliary environmental control unit 24 is not of significant importance as the present invention is beneficial and applicable to all types of units such as those types generally described in the background section above. For example, the auxiliary control unit 24 may be of the active type and comprise an electrically powered heater and air conditioner, or alternatively a fuel powered heater and air conditioner. Or, the auxiliary control unit 24 may also be passive in nature aggregating stored excess energy from the primary environmental control unit through thermal storage media or phase change media. In any event, the thermal barrier of the present invention allows a reduction in energy requirements of the air conditioning system of the auxiliary control unit without sacrificing comfort and thermal environmental qualities. Under currently available technology, the air conditioning system of the auxiliary control unit may have a maximum output of less than about 2000 btu per hour and even more preferably a maximum output of less than about 1500 btu per hour, while accomplishing thermal characteristics exhibited by air conditioning system units capable of outputting 3500 btu per hour. The present invention thus reduces the size, weight and powering requirements of the air conditioning system and expands the options available for vehicle designers.

According to one aspect of one embodiment, the thermal barrier may provide for an environmental control unit that includes a separately powered electrically powered air conditioning system and a separately powered heating system not powered by electricity but other means such as fuel which directly generates heat. With this type of an auxiliary system, the electrical requirements only need to satisfy anticipated power consumption of the air conditioning system. This allows the air conditioning compressor, the electrical power storage (e.g. batteries) or electrical generator, and other components to be more compact, lighter and also significantly less expensive, thereby making auxiliary environmental control units much more practical.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. In a vehicle having a cab area and a bunk area adjacent the cab area, an environmentally controlled sleeping area within the bunk area, the bunk area comprising an end wall and a pair of side walls extending generally perpendicular to the end wall, the environmentally controlled sleeping area comprising:
   a bed having first and second sides and a top surface between sides for supporting a person, the first side adjacent the end wall, the bed having opposing ends adjacent the side walls, the end wall and side walls extending above the top surface of the bed;
   a thermal barrier along the second side of the bed rising above the top surface thermally separating the sleeping area from a remainder of the bunk area; and
   an environmental control unit having a discharge outlet above the bed arranged to discharge thermally conditioned air between the end wall and thermal barrier such that during operation thermally conditioned air is trapped over the bed by the thermal barrier.

2. The environmentally controlled sleeping area of claim 1 wherein the thermally conditioned air includes thermally cooled air.

3. The environmentally controlled sleeping area of claim 1, wherein the environmental control unit has a return inlet, the environmental control unit receiving air through the return inlet and providing thermally conditioned air through the discharge outlet, the discharge outlet being located above the return inlet.

4. The environmentally controlled sleeping area of claim 1 wherein the environmental control unit is an auxiliary control unit that is auxiliary to a primary environmental control unit for the vehicle, the primary environmental control unit adapted to provide thermally conditioned air to the cab area.

5. The environmentally controlled sleeping area of claim 4 wherein the auxiliary control unit comprises an electrically powered air conditioner.

6. The environmentally controlled sleeping area of claim 5 wherein the auxiliary control unit comprises a fuel powered heater.

7. The environmentally controlled sleeping area of claim 4 wherein the auxiliary control unit is passive and comprises thermal storage media.

8. The environmentally controlled sleeping area of claim 5 wherein the air conditioner has a maximum output of less than about 2000 btu per hour.

9. The environmentally controlled sleeping area of claim 8 wherein the air conditioner has a maximum output of less than about 1500 btu per hour.

10. The environmentally controlled sleeping area of claim 1 wherein the thermal barrier comprises a partial wall extending only partially above the top surface short of a ceiling of the bunk area.

11. The environmentally controlled sleeping area of claim 10 wherein the thermal barrier extends to a vertical height of between about 1 foot and about 2 foot vertically above the top surface of the bed.

12. The environmentally controlled sleeping area of claim 10 wherein the thermal barrier is removable to allow entry and exit to and from the bed.

13. The environmentally controlled sleeping area of claim 12 wherein the thermal barrier comprises a curtain that extends and retracts upwardly and downwardly relative to the top surface.

14. The environmentally controlled sleeping area of claim 12 wherein the thermal barrier a curtain that is horizontally extendible and retractable.

15. The environmentally controlled sleeping area of claim 1 wherein the environmental control unit has an outlet port through the end wall.

16. An environmentally controlled sleeping area comprising a thermal barrier projecting above a bed and at least partially enclosing each of all four sides of the bed and an environmental control unit providing thermally conditioned air between said four sides, the thermally conditioned air being trapped on top of the bed by the thermal barrier, wherein the environmentally controlled sleeping area is contained in the bunk area of a vehicle, wherein the outer walls of the bunk area enclose three sides of the bed, further comprising a partial wall extending only partially above the top surface short of a ceiling of the bunk area enclosing the remaining side of the bed, and wherein the partial wall is removable to allow entry and exit to and from the bed.

17. The environmentally controlled sleeping area of claim 16 wherein the partial wall comprises a curtain that extends and retracts upwardly and downwardly relative to the top surface.

18. The environmentally controlled sleeping area of claim 16 wherein the partial wall comprises a curtain that is horizontally extendible and retractable.

19. The environmentally controlled sleeping area of claim 16 wherein the environmental control unit is an auxiliary control unit that is auxiliary to a primary environmental control unit for the vehicle, the primary environmental control unit adapted to provide thermally conditioned air to a cab area of the vehicle.

20. The environmentally controlled sleeping area of claim 16, wherein the environmental control unit has a return inlet and an outlet, the environmental control unit receiving air through the return inlet and providing thermally conditioned air through the outlet, the outlet being located above the return inlet.

21. An environmentally controlled sleeper area in a bunk area of a vehicle, the bunk area is adjacent to a cab area of the vehicle, the bunk area having an end wall and a pair of side walls extending generally perpendicular to the end wall, the side walls and the end wall encompassing three sides of a bed, thereby leaving an open side of the bed whereby a person can maneuver in and out of the bed, further comprising:
   a thermal barrier along the remaining open side of the bed, the thermal barrier adapted to rise above the top surface of the bed and thermally separate the sleeping area from a remainder of the bunk area; and
   an environmental control unit having a discharge outlet above the bed arranged to discharge thermally conditioned air over the bed, wherein the thermal barrier traps thermally conditioned air along the top of the bed between the back wall and thermal barrier.

22. The environmentally controlled sleeping area of claim 21 wherein the thermally conditioned air includes thermally cooled air.

23. The environmentally controlled sleeping area of claim 22, wherein the environmental control unit has a return inlet and an outlet, the environmental control unit receiving air through the return inlet and providing thermally conditioned air through the outlet, the outlet being located above the return inlet.

24. The environmentally controlled sleeping area of claim 21 wherein the environmental control unit is an auxiliary control unit that is auxiliary to a primary environmental control unit for the vehicle, the primary environmental control unit adapted to provide thermally conditioned air to the cab area.

25. The environmentally controlled sleeping area of claim 24 wherein the auxiliary control unit comprises an electrically powered air conditioner.

26. The environmentally controlled sleeping area of claim 25 wherein the auxiliary control unit comprises a fuel powered heater.

27. The environmentally controlled sleeping area of claim 24 wherein the auxiliary control unit is passive and comprises thermal storage media.

28. The environmentally controlled sleeping area of claim 25 wherein the air conditioner has a maximum output of less than about 2000 btu per hour.

29. The environmentally controlled sleeping area of claim 28 wherein the air conditioner has a maximum output of less than about 1500 btu per hour.

30. The environmentally controlled sleeping area of claim 21 wherein the thermal barrier comprises a partial wall extending only partially above the top surface short of a ceiling of the bunk area.

31. The environmentally controlled sleeping area of claim 30 wherein the thermal barrier extends to a vertical height of between about 1 foot and about 2 foot vertically above the top surface of the bed.

32. The environmentally controlled sleeping area of claim 30 wherein the thermal barrier is removable to allow entry and exit to and from the bed.

33. The environmentally controlled sleeping area of claim 30 wherein the thermal barrier comprises a curtain that extends and retracts upwardly and downwardly relative to the top surface.

34. The environmentally controlled sleeping area of claim 30 wherein the thermal barrier a curtain that is horizontally extendible and retractable.

35. The environmentally controlled sleeping area of claim 1, wherein the thermal barrier traps thermally conditioned air on top of the bed.

36. The environmentally controlled sleeping area of claim 1, further comprising a partition between the bunk area and the cab area, the thermal barrier being spaced rearward from the partition.

37. The environmentally controlled sleeping area of claim 1, wherein the thermal barrier is operably connected to the bed and not spaced therefrom.

38. The environmentally controlled sleeping area of claim 21, further comprising a partition between the bunk area and the cab area, the thermal barrier being spaced rearward from the partition.

39. The environmentally controlled sleeping area of claim 21, wherein the thermal barrier is operably connected to the bed and not spaced therefrom.

* * * * *